Figure 1:
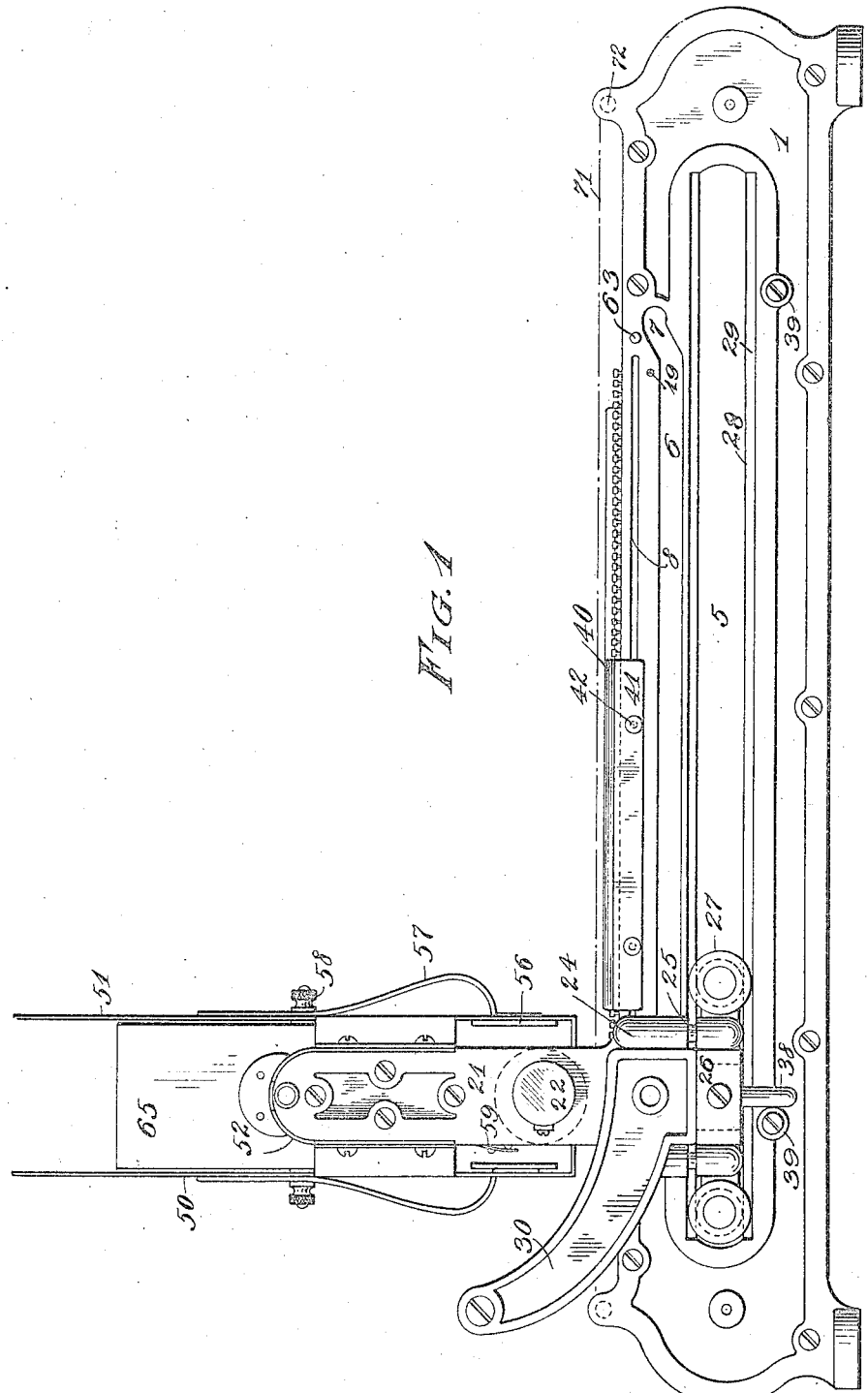

B. B. WEST.
PRINTING MACHINE.
APPLICATION FILED JUNE 29, 1908.

1,106,906.

Patented Aug. 11, 1914.
8 SHEETS—SHEET 5.

WITNESSES:
Nathan F. Fretter.
H. Miller

INVENTOR,
Brennan B. West.
By Baker, Jouts & Hull,
ATTYS.

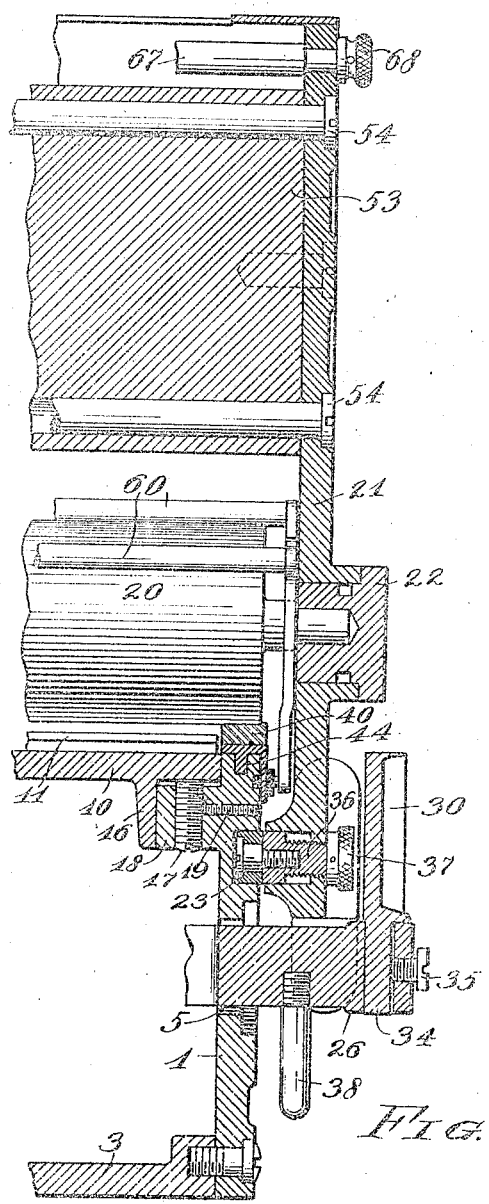
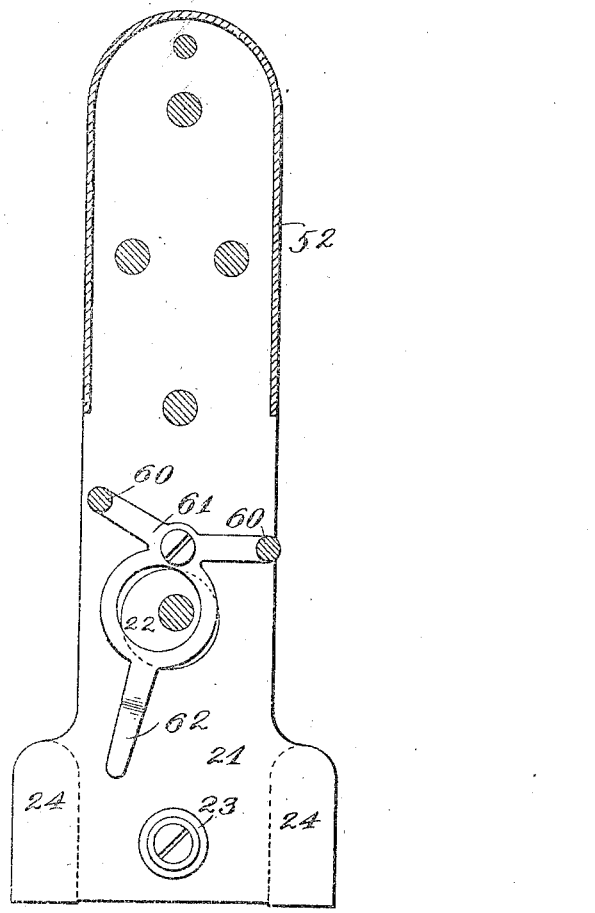

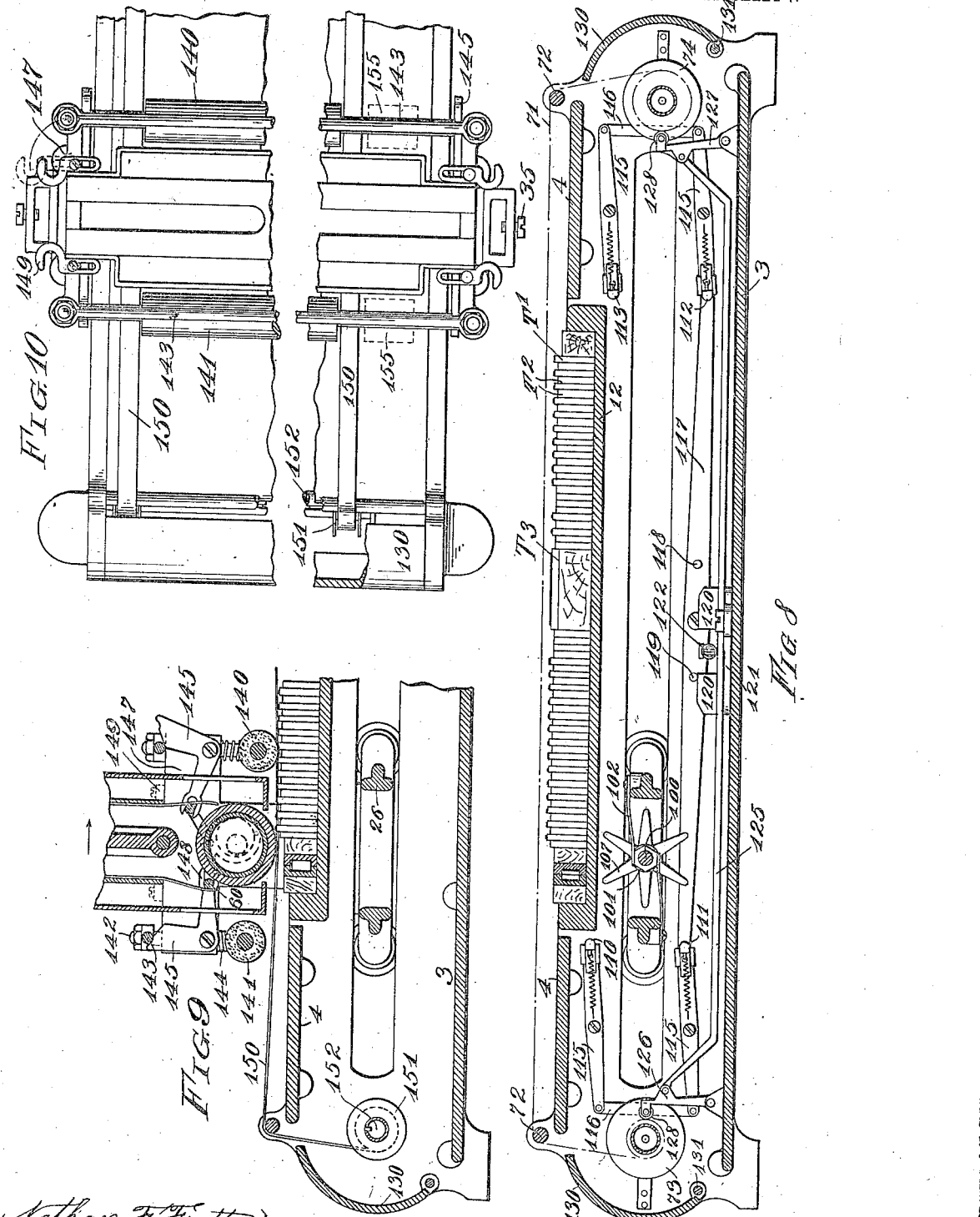

UNITED STATES PATENT OFFICE.

BRENNAN B. WEST, OF CLEVELAND, OHIO, ASSIGNOR TO THE AMERICAN MULTIGRAPH COMPANY, OF CLEVELAND, OHIO, A CORPORATION OF OHIO.

PRINTING-MACHINE.

1,106,906.

Specification of Letters Patent.

Patented Aug. 11, 1914.

Application filed June 29, 1908. Serial No. 440,786.

*To all whom it may concern:*

Be it known that I, BRENNAN B. WEST, a citizen of the United States, residing at Cleveland, in the county of Cuyahoga and State of Ohio, have invented a certain new and useful Improvement in Printing-Machines, of which the following is a full, clear, and exact description, reference being had to the accompanying drawings.

The object of this invention is to provide a simple and effective printing mechanism.

The machine is primarily designed for an office printing press.

It is capable of printing either through an inking ribbon or from directly inked type, as desired; it automatically feeds the paper to the printing surface and automatically delivers the printed sheet; it automatically reverses the feed of the inking ribbon, when such ribbon is used; it is adapted for use with either ordinary foundary type or electrotypes, or specially formed type; the printing surface, whatever its character, may be removed as a whole page form and a new page form substituted. These and other features enter into my machine.

A preferred embodiment of the machine is shown in the drawing and is hereinafter more fully described, and what I regard as the essential characteristics of my invention are set out in the claims.

Figure 2:
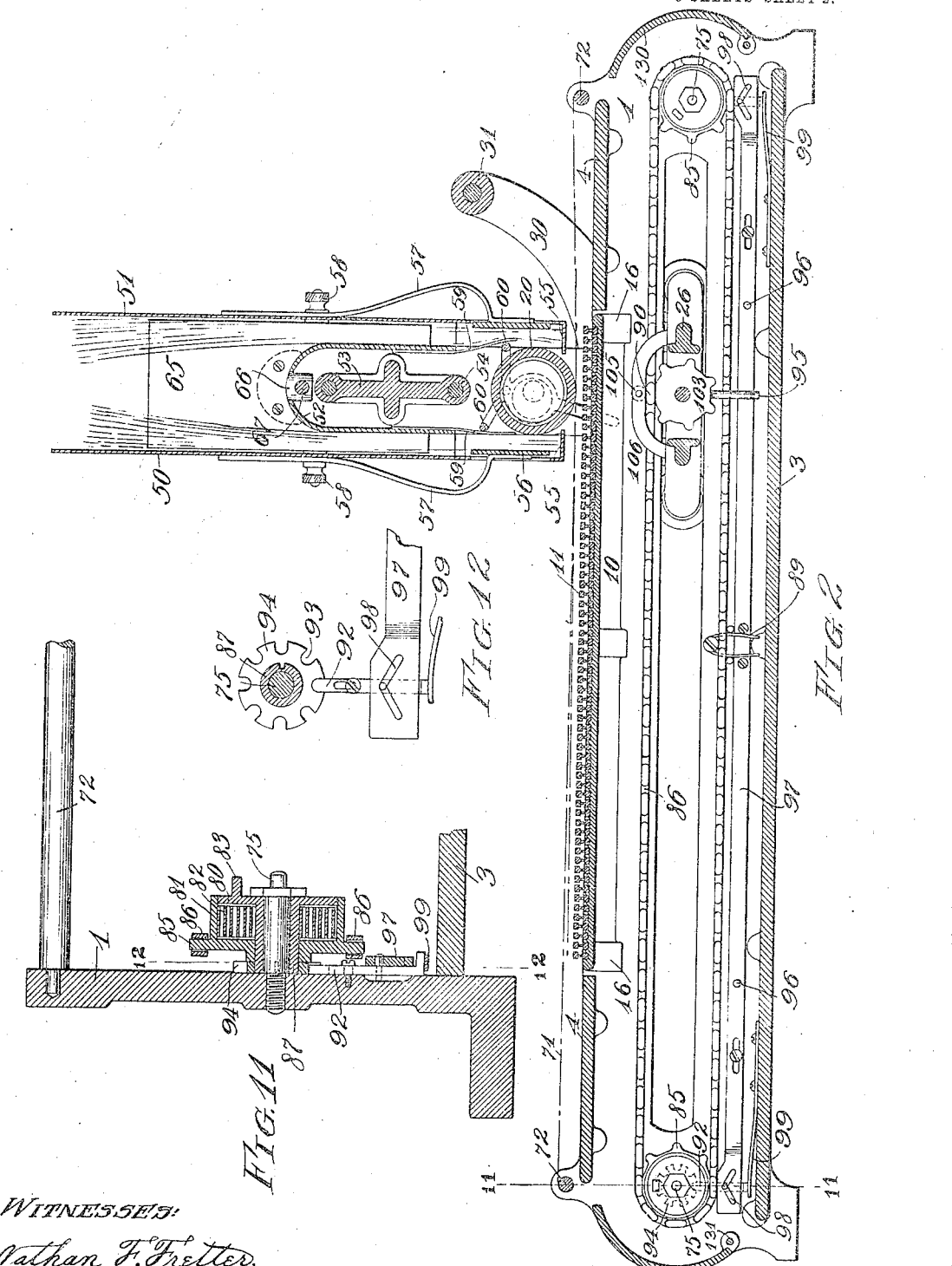
Figure 3:
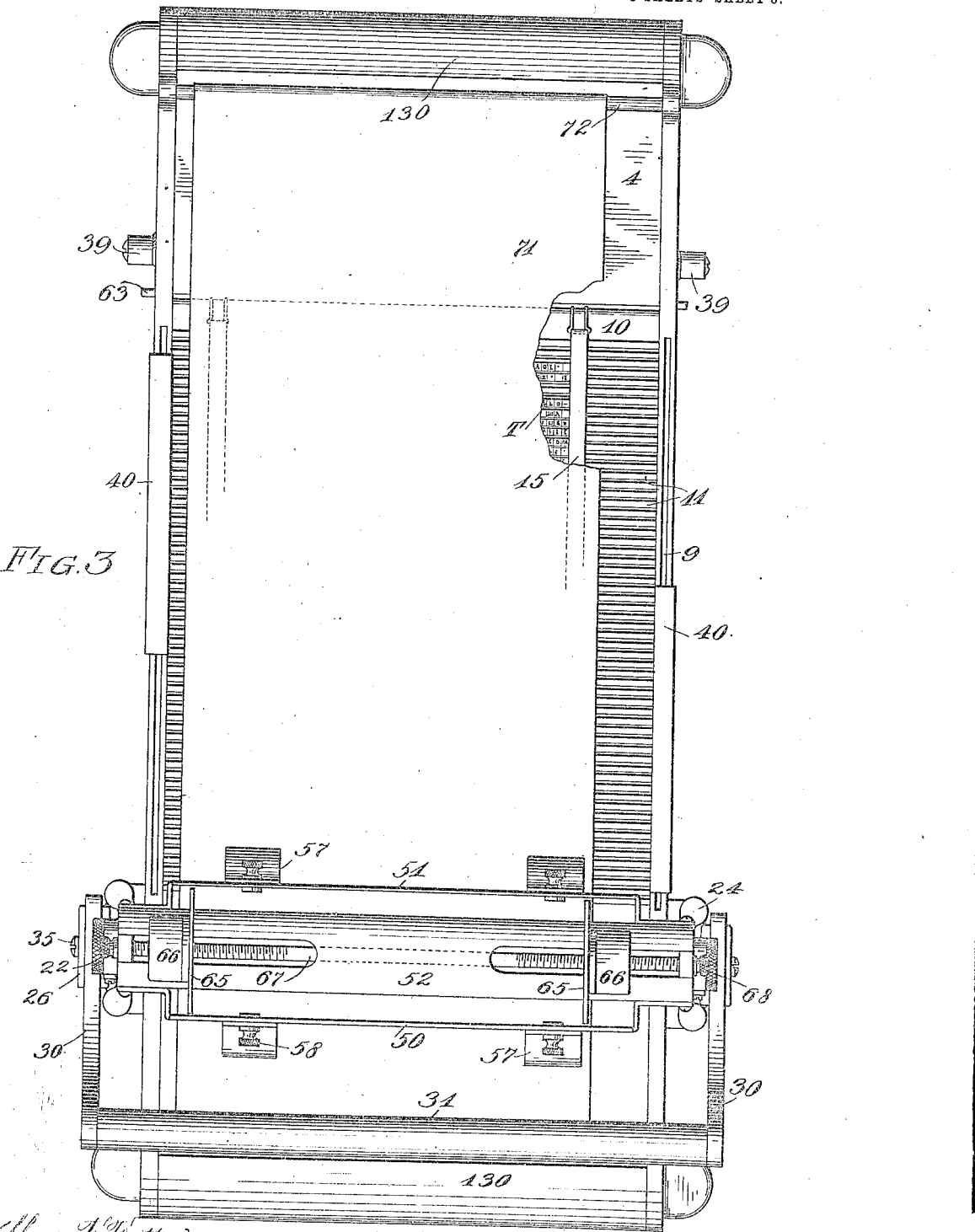
Figure 4:
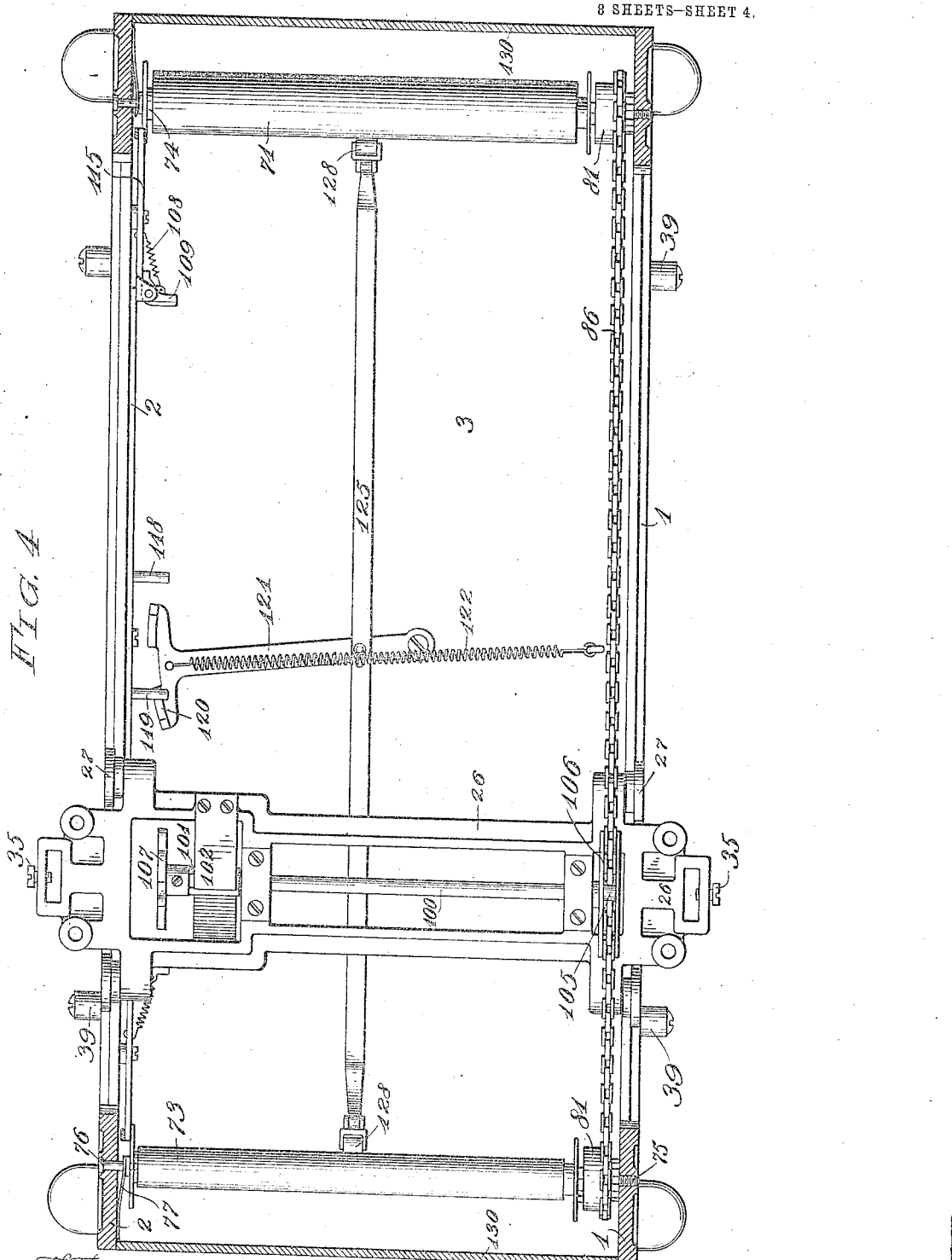
Figure 5:
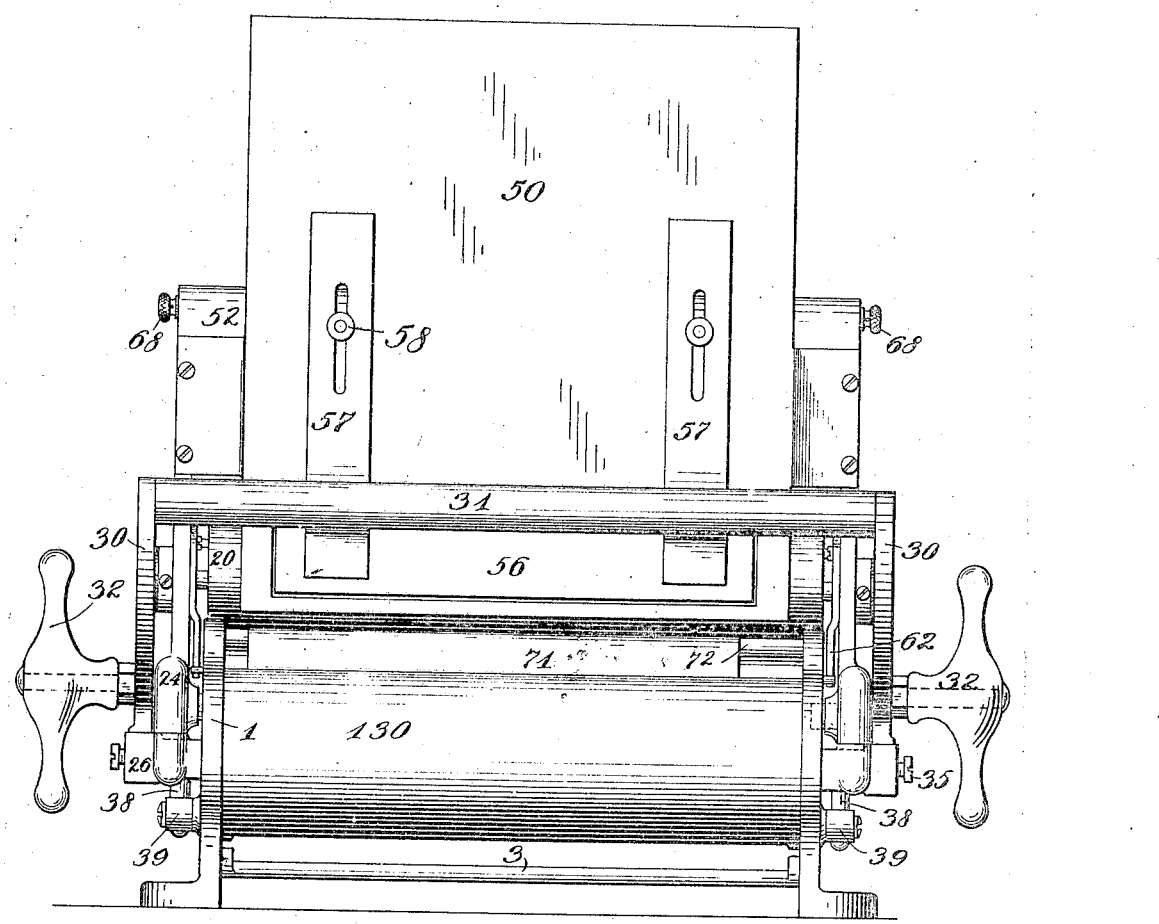
Figures 13, 14:
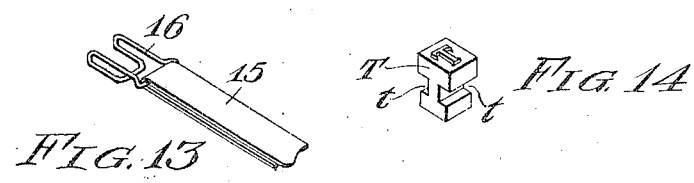
Figure 16:
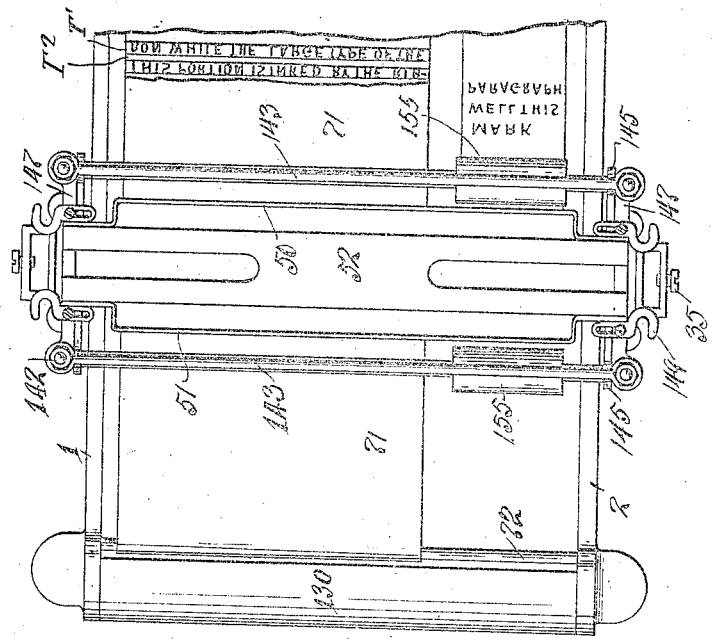
Figure 15:
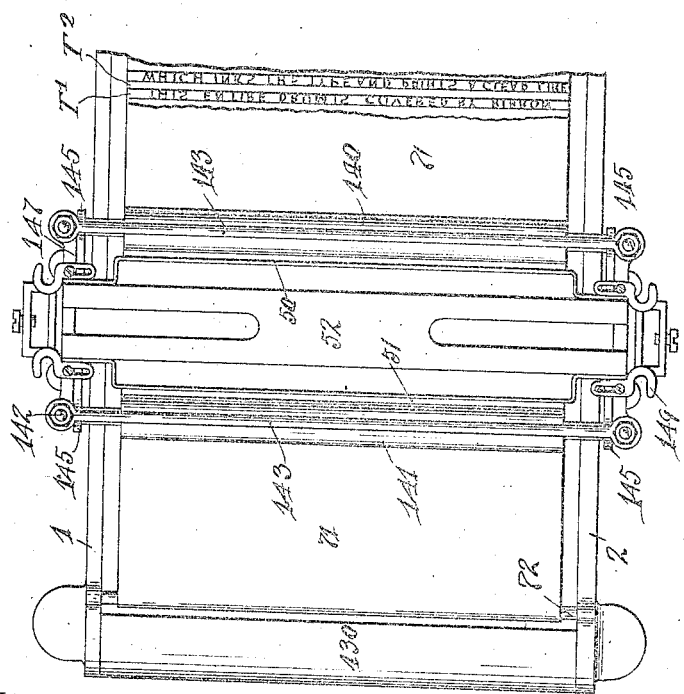

In the drawings, Figure 1 is a side elevation of the machine complete; Fig. 2 is a longitudinal section thereof looking from opposite direction to Fig. 1; Fig. 3 is a plan; Fig. 4 is a sectional plan below the type bed; Fig. 5 is an end view of the machine; Fig. 6 is a vertical section on an enlarged scale through the traveling carriage which carries the paper and the platen; Fig. 7 is a vertical section through this platen carriage; Fig. 8 is a longitudinal vertical section through the bed portion of the machine looking in the opposite direction to Fig. 2 and showing the type bed carrying standard type and an electrotype; Fig. 9 is a vertical section similar to Fig. 8 but showing a portion of the platen carriage with the direct inking attachment thereon; Fig. 10 is a portion of a plan of the machine with the direct inking attachment; Fig. 11 is a vertical transverse section of the bed as indicated by the line 11—11, Fig. 2; Fig. 12 is a detail showing the lock for the spring barrel as indicated by the line 12—12, Fig. 11; Fig. 13 is a perspective view of the end of one of the marginal bands which may be employed to hold the type in place; Fig. 14 is a perspective view of the type which may be employed with the bed having type holding rails as shown in Figs. 2 and 3. Fig. 15 is a partial plan showing a wide inking and delivery ribbon replenished by inking rollers; Fig. 16 is a similar partial plan with the inking ribbon covering only a portion of the form and an inking roller acting directly on the uncovered portion.

As shown in the drawings, the machine is designed to stand upon a table, the platen carriage being reciprocated by a hand power. The stationary frame of the machine comprises side plates 1 and 2, a cross base plate 3, cross top plates 4, 4, and screws passing from the side plates into the cross plates, or lugs carried by them to secure these parts to make a rigid frame. This frame is symmetrical and is low and flat and adapted to rest on a table. The frame is of such size that the space bounded by the side plates and the two top plates 4 may be as large as the body of the largest sheet ordinarily printed. In this space I mount the page form for the printing. As shown in Fig. 2 the type bed or support for the page form consists of a braced plate 10, carrying parallel rails 11 which have overhanging edges, these rails being adapted to confine between them type grooved on its opposite sides, as shown in Fig. 14, where the type is designated T and the grooves t. If standard foundry type should be employed the bed takes the form shown at 12 in Fig. 8. In this view T' represents standard type, T² spacing rails between them and T³ an electrotype.

In the form shown in Fig. 8, type are supposed to be locked in the frame after the manner of ordinary type in a chase. In the form shown in Fig. 2 the type are somewhat loose by being mounted on the rails and may be held against displacement endwise of the rails by marginal bands 15, shown in Figs. 3 and 13, which have hooks 16 at their ends adapted to hook over the extreme ends of the bed plate 10. Either form of the type bed may constitute a rigid, immovable part of the frame, though I regard it as preferable to have this bed plate removable so that the page form may be removed as a whole. This is accomplished by having the bed plate rest near its edges on shoulders projecting from the inner faces of the side plates 1 and 2. As shown in Fig. 6, such shoulders may take the form of lugs 18 which extend beneath the type bed or into housings 16 carried thereby. The plate fits this seat with some snugness, so that no other securing means is necessary. Accurate adjustment may be provided by the screws 17 locked by set screws 19.

A comparison of Figs. 2 and 8 will show that either form of type bed may be adapted for insertion in the same frame, the plates being formed to have the same depth at their side edges. This increases the adaptability of the machine. It further allows the operator to use grooved type on the railed bed with the attendant advantages of closer imitation of type-writing due to the looseness of the type, or to substitute whenever desired a made up form of ordinary type or electrotypes. Furthermore, a number of page forms may be kept standing and one substituted for the other whenever desired. This is a great advantage as it allows form letters to be kept standing.

The platen which coöperates with the type consists of a roller 20 mounted in a traveling carriage 21. The presentation of the roller to the type may be accurately adjusted by means of eccentrics 22 in which the journals of the roller bear. The platen carriage extends downwardly and to opposite sides of the frame plates 1 and 2 and there carries rollers 23 which are adapted to occupy longitudinal grooves or slots 6 in the frame plates whereby the platen will be held down to its work. Each of the side plates 21 of the platen carriage has near its lower end two tubular bosses 24; these bosses are occupied by pins 25 projecting upwardly from a lower carriage 26 which is provided with four wheels 27 riding on tracks 28 provided by longitudinal slots 5 in the side plates 1 and 2. The wheels 27 preferably have outside flanges which occupy recesses 29 in the outer sides of the side plates adjacent to the slots.

From the above described construction it results that if one of said carriages is shifted longitudinally the other will travel with it while the platen carriage is adapted to rise and fall independently of the lower or frame carriage. Near its end the slot 6 inclines upwardly as shown at 7, in Fig. 1, and in the extreme position of the platen carriage the rollers 23 occupy these elevations, holding the platen above the plane of the type. When the carriage is moved from the extreme position the incline 7 of the slot 6 first brings the platen down into position to print, thereafter during subsequent movement it is maintained in position until the other incline 7 raises the carriage to idle position. This raising the carriage allows for the delivery of the paper as hereinafter explained.

As the paper is fed and delivered automatically, the operator has both hands free, and I accordingly provide handles so that the operator may use one or both hands to shift the carriages. Thus I provide arms 30 which have tongues 34 (Fig. 6) adapted to occupy pockets in the ends of the carriage 26 and be clamped by set screws 35. These arms are connected by a cross bar 31 which the operator may conveniently take hold of. Furthermore, extra handles may be provided at the sides of the machine, should the operator desire them. These extra handles are shown at 32 in Fig. 5. They are swiveled on pins which screw into the arms 30. In ordinary manipulation the operator may reciprocate the carriage with one hand, but where extra heavy printing is desired, or where an inking ribbon becomes much worn and extra platen pressure is used, the two handles may be of use to give the platen an increased pressure.

Depending from the carriage 26 is a suitable pin 38 which is adapted to engage stationary buffers 39 to limit the travel of the carriage. The carriages and the frame are symmetrically formed so that the machine may be operated alike from either end. It is only necessary to loosen the set screws 35 to remove the handles and place them with the bar 31 on the other side of the platen carriage. By removing the arms 30 the rollers 23 may be withdrawn from the slots 6 by turning the heads 37 (Fig. 6) of the threaded plugs 36 which carry the studs on which the rollers are journaled. Such turning draws the roller 23 out into the recess normally filled by the plugs 36. This unlocks the platen-carriage so that it may be lifted off.

To insure the platen rotating before it strikes the type, preventing smudging at this first engagement as well as to control the paper feed, as hereinafter explained, I provide the yielding tracks 40 which may consist of rubber strips mounted on a metal carrier 41 adjustably clamped to the frame by set screws 42 taking into recesses 8 in the frame. The carrier plates 41 may have downwardly projecting ribs 44, Fig. 6, occupying grooves 9, Fig. 3, in the frame plates. To make this track adjustable in effective length, I make each of the yielding tracks less than the full length of the bed and I mount them in staggered position on opposite sides of the frame as shown in Fig. 3. This is to control the paper feed initiating the feeding with reference to the matter carried in the type bed as hereinafter explained. My platen carriage provides also means for carrying the paper and automatically feeding it as the carriage is reciprocated. This means includes two vertical plates 50 and 51 extending crosswise of the carriage on opposite sides of the platen and rising above it and an intermediate separator which may be a pair of plates, but is shown as a single U-shaped plate 52. This plate 52 extends around a distance block 53 and tie rods 54 screwing from one side plate 21 through the distance block into the other side plate. It will be seen that there is provided between the opposite sides of the separator 52 and the two plates 50 and 51, a pair of vertical pockets. At the lower ends of these pockets are flanges 55 turned inwardly from the upright plates. A short distance above these flanges are pressure plates 56 mounted on the ends of springs 57 adjusted by nuts 58. A block of paper stands on edge on the flange 55 and is pressed by the plate 56 against the platen 20. This construction is the same on each side of the platen.

Projecting downwardly from the lower edges of the plate 52 are springs 59, either of which is adapted to be pressed against the block of paper in the corresponding pocket by rods 60 mounted on the arms of pivoted dogs 61 which yoke loosely around the journals of the platen and have their lower ends 62 in position to engage the pins 63, carried by the frame near the opposite ends of the type bed.

From the above construction it results that when the platen carriage is drawn into either extreme position the spring 59 on the side of the carriage nearest that extreme position is forced into position to clamp the paper, the paper on the opposite side being free. Now if the carriage is shoved forwardly toward the opposite end of the machine, the forward side of the platen rotates downwardly with reference to the block of paper therein, which is forced against the platen by the pressure plate 56, and the result is that the front sheet on this page is buckled over the edge of the flange 55 and is engaged between the rotating platen and the type form and is thus fed gradually into position as the platen rolls over the sheet. As the platen reaches the extreme end of its movement and has fed and printed a sheet, the block of paper from which the sheet was fed becomes clamped and the other block released by reason of the end 62 of the dog engaging the pins 63 and swinging the dog into its other extreme position. It will accordingly be seen that when the platen carriage is operated with paper arranged in two blocks in the two pockets, it is only necessary to draw the carriage back and forth to automatically feed the paper downward in advance of the platen irrespective of the direction in which the carriage is traveling, suitable means hereinafter described being provided to deliver the printed sheets. Thus the reciprocation of the carriage results in automatically performing the complete printing operation without attention by the operator.

Suitable edge guides for the blocks of paper in the pockets are provided, comprising side plates 65 which yoke around the separator plate 52 and carry right and left hand nuts 66 on a rod 67 which extends crosswise of the carriage and has on its ends knobs 68 by which it may be turned to move the edge guides inwardly or outwardly.

As heretofore stated, the type may be inked either directly or the printing may be accomplished by an inking ribbon between the type and platen. In the latter case, I mount the inking ribbon at its ends on spools and I provide mechanism to rotate one or the other of these spools immediately following the completion of the platen stroke, to move the ribbon in the opposite direction to deliver the printed sheet. This is one of the novel features of my invention and will now be described.

71 (Figs. 3 and 8) indicates the inking ribbon which extends substantially horizontally across the type form lengthwise of the bed and over rollers 72 journaled in the frame and has its ends mounted on spools 73 and 74. These spools are mounted on studs 75 and 76 (Fig. 4) carried by the frame members 1 and 2, the stud 76 being movable axially to allow the removal of the spool and being held in place by a spring 77 bearing against a shoulder on the stud.

Surrounding each of the stationary studs 75 is a spring barrel comprising an inner member 80, an outer member 81 and an interposed spring 82, as shown in Fig. 4. The member 80 carries a lug 83 which may engage a flange in one of the spools. On the member 81 of the spring barrel is formed a sprocket wheel 85. Over the sprocket wheels 85 of the two spring barrels takes a sprocket chain 86 which is intermediately connected at 90 (Fig. 2) with the frame carriage. The spiral springs 82 are of such nature that they may be wound to exert either a pushing or pulling effect on the member 80. The result is that when the carriages are drawn to one end of the stroke, the spring barrel at the opposite end of the machine is wound up with a tendency to pull the ribbon in that direction, while the spring barrel at the other end of the machine is wound with a tendency to rotate its spool to unwind the ribbon.

During the printing stroke, the ribbon is stationary because the members 80 of the spring barrels are locked by reason of a dog 92 engaging in one of the notches 93 of the notch ring 94 which is rigid on the barrel 87 of the member 80. As soon, however, as the carriage reaches one end or the other of its stroke, a pin 95 depending from the carriage engages one or the other of the stops 96 on the shiftable bar 97, which has a double inclined slot 98 in which takes a pin on the dog 92. Accordingly, whenever the pin 95 engages one of the pins 96 the bar is shifted to pull down the dogs 92 to release the wheels 94, which release the inner members of the spring barrels, when they are free to rotate, the spool at the near end of the frame unwinding the ribbon, and the spool at the far end winding it in. This movement is accomplished with rapidity and operates to deliver the printed sheet off of the far end of the machine.

As soon as the return stroke of the carriage starts, the spring 89, assisted by the springs 99, acting on the dogs 92 return the parts to normal position, the dogs engaging in notches in the wheels 94 and holding the ribbon against movement. Then at the end of that stroke, the barrels having been rewound in the opposite direction, the ribbon is fed in the opposite direction to deliver the next sheet from the other end of the machine, and so on. It will accordingly be seen that the delivery is entirely automatic and may be accomplished by the movement of the ribbon itself.

To give the ribbon a periodic feed so that it will make a different presentation to the type for each stroke, I connect the sprocket chain 86 to the frame carriage 26 in such manner that, while the two are locked for the most of the stroke, at a certain point the chain is given a slight additional movement to gradually wind the ribbon onto one spool or the other. This I accomplish by mechanism shown in Figs. 2, 4 and 8, and which I will now describe.

Mounted within the transverse frame of the carriage 26 is a transverse shaft 100. Near one end this shaft has flattened faces 101 on which bear springs 102 preventing inopportune rotation. On its other end, the shaft carries a sprocket wheel 103 which engages the sprocket chain at the point 90 (Fig. 2), such engagement being insured by a roller 105, carried by a yoke 106 on the carriage. Ordinarily therefore the sprocket chain is locked at 90 to the carriage. On the far end of the shaft 100, however, is a star wheel 107, which, as the carriage is approaching the end of its stroke, is adapted to engage one of the abutments 110, 111, 112, or 113, shown in Fig. 8. These four abutments will be presently described in connection with the automatic ribbon reverse. For the present, it is sufficient to say that two of them (one upper and one lower) are always in idle position. As shown in Fig. 8, the upper right hand abutment and the lower left hand abutment are active. Accordingly, with the parts in this condition, when the carriage approaches its extreme left hand position, one of the lower teeth on the star wheel 107 will engage the abutment 111, rotating the star wheel one tooth to feed the ribbon a slight distance onto the spool 73. At the other end of the stroke, one of the upper teeth of the star wheel will engage the abutment 113 which will give the ribbon a slight feed in the same direction by causing the rotation of the spool 73. Accordingly fresh surface is presented to the type for each impression. The ribbon feed will cause the ribbon to gradually wind onto one spool and off the other, so that in due course one spool will be filled and the other empty. At such time an automatic ribbon reverse which I have provided comes into action and changes the direction of ribbon feed.

The automatic ribbon reverse is best shown in Fig. 8. It includes the four abutments 110 to 113 which I have heretofore described, which are on the ends of pivoted levers 115 arranged in two pair at the opposite ends of the machine, the opposite ends of each pair of levers being connected by a link 116. The two lower levers of both pairs are connected together by a long lever 117 pivoted at its central point to one of the side members of the frame. This lever carries on opposite sides of its pivot projecting pins 118 and 119. One or the other of these pins is adapted to be engaged and held elevated by cam surfaces 120 formed on the head of a lever 121 pivoted to the base plate 3 and held in their extreme position by a spring 122. This is best shown in Fig. 4. The lever 121 is connected with a link 125 which extends longitudinally of the machine and has its ends hinged to arms 126 and 127 which carry rollers 128 bearing against the ribbon surface on the respective spools.

From the described construction, it results that the position of the lever 121 is dependent upon the condition of the ribbon on the spools. As one spool becomes filled and the other empty, the link 125 gradually shifts in the corresponding direction, and this shifts the lever 121. This lever, by holding up one or the other of the pins 118 or 119, controls the position of the abutments which control the ribbon reverse. As shown in Fig. 8, the spool 74 is substantially filled and the spool 73 is substantially empty, and as a result, the arm 127 has been forced to the left, and the lever 121 correspondingly shifted to raise the pin 119 to reverse the ribbon.

In Fig. 8, the ribbon feed has just been reversed and the spool 73 is doing the feeding. As the ribbon gradually accumulates on this spool, the arm 126 is gradually forced toward the right, which gradually moves the lever 121 accordingly. The proportion of the parts is such that this movement is idle until substantially the whole of the ribbon has accumulated on the spool 73. When this is accomplished, the lever 121 has been forced to a point just beyond its dead center, whereupon the spring 122 swings it immediately into the other extreme position, releasing the pin 119 and engaging and camming upward the pin 118 to raise the abutment 112 into active position and to correspondingly lower the abutment 110, while the abutments 111 and 113 are at the same time swung into idle position. Accordingly the direction of rotation of the star wheel is reversed, which reverses the ribbon feed. This changes the direction of gradual movement of the link 125, but, as stated, this movement is idle, owing to the elongated flat face of the lugs 120, until the ribbon is wound onto the opposite spool. It will accordingly be seen that my ribbon not only provides an inking surface and is fed with each stroke a distance approximately corresponding to the length of the printed sheet to deliver the same, but that this ribbon is also combined with mechanism for gradually feeding it to present a fresh face and that such feed is automatically reversed when the end of the ribbon is reached.

To provide for conveniently installing the ribbon and at the same time protect the operator's hands or garments from coming in contact with the same, I provide the curved hinged doors 130 which stand between the frame plates 1 and 2 at the ends thereof and are hinged at their lower edges by a cross rod 131. This gives a neat appearance to the completed structure and at the same time allows easy access to the interior, as, whenever desired, the upper edge of the door may be grasped by the finger and the door swung downwarly and outwardly.

Each of the abutments 110 to 113 may consist of a dog or pawl in the form of a bell crank 109 (Fig. 4) pivoted on the end of the arm 115 and held by a spring 108. During the feeding operation, the abutment is in effect rigid with the arm. To prevent backward movement of the star wheel when it moves in idle direction across the abutment, I provide the construction shown enabling the star wheel to move past the abutment, the abutment swinging aside by reason of its pivot and spring.

It remains to describe the additional inking features which may be used in place of the ribbon or in conjunction with it. Thus I may provide inking rollers carried by the platen carriage, and these may be used either with the inking ribbon, or in place of the ribbon. In the latter case I may provide tapes which deliver the printed sheet, the ribbon feed and ribbon reverse being then disconnected.

Referring to Figs. 9 and 10, there will be seen on opposite sides of the platen carriage a pair of felt inking rollers 140 and 141. The shafts of these rollers are carried at their ends by upright rods 142 which are connected by cross rods 143. Springs 144 surrounding the rods 142 tend to bring the rollers down to active position. Bell cranks 145 pivoted to extensions 147 of the side plates 21 of the carriage may operate to engage the rods 143 and raise the rollers into idle position. To effect this movement to idle position alternately for the two rollers on succeeding strokes, the inner ends of the bell cranks 145 are bifurcated as shown at 148 and take around the rods 60 carried by the members 61 which operate the paper clamps and which are shifted at each end of the stroke. The result is that these members 61 hold the inking roller on the rear side of the platen elevated, as shown in the case of the roller 141, while allowing a roller on the forward side of the platen to be forced downward by its spring into engagement with the type, as shown at 140. The forward movement of the platen, as indicated by the arrow in Fig. 9, therefore first inks the type, and then, as already explained, feeds the paper downwardly in advance of the platen, the platen rolling over the inked type and printing the paper. As the platen reaches the end of its stroke, the tail of the yoke member 61 engages the pin 63, as heretofore explained, rocking that member and shifting the bell cranks 145 to raise the inking roller 140 and lower the inking roller 141. The parts are thus automatically thrown into position for the return stroke.

To hold the inking rollers both idle, when printing with a ribbon, I provide the hooked distance pieces 149 which are shown as idle in Fig. 10 but may be drawn outwardly (by reason of their slots) and swung to engage beneath the heads on the rods 142, thereby holding them elevated.

To deliver the paper where the direct inking arrangement is used, I may substitute for the inking ribbon the two tapes 150, Figs. 9 and 10. The ends of these tapes are mounted on reels 151 carried on a barrel 152 which takes the place of the ribbon spool heretofore described, and is engaged and operated by the spring barrel in the same manner. When the tapes are used, there is no necessity for either a gradual feed or an reverse thereof. To eliminate this therefore I simply disconnect the star wheel 107 which is mounted on the end of the shaft 100 and normally secured thereto by a set screw. This disconnection renders nugatory the feeding mechanism, for the springs 102 hold the rod 100 against rotation so that the sprocket chain is in effect locked to the carriage. The reversing mechanism is also idle.

As illustrated in Fig. 15 the inking rollers may also be used in combination with the inking ribbon, the rollers serving to act on the ribbon and increase its printing qualities. Thus the rollers may carry ink of a quantity and quality which will not smudge the paper but may serve to replenish the ribbon. Where the ribbon is very dry the rollers may be used to moisten it, the rollers being simply dampened with water or a suitable chemical. For printing with those classes of material where preliminary sizing is necessary, the sizing may be carried by the roller and the final material by the ribbon. The roller and ribbon may also be used in conjunction for printing in different colors on different portions of the page, the inking ribbon extending over a portion of the page and the roller carrying ink acting on the type beyond the edge of the ribbon. This is very convenient, for example, for printing in red ink on the margin of a letter, short rollers 155 being used in such case, as shown in Fig. 16 and also indicated by dotted lines in Fig. 10. For this class of work the ribbon and the roller are of such size and have such position that they act on different portions of the form, as shown in Fig. 16. In Figs. 15 and 16, the parts not described in this paragraph are the same as heretofore described.

The rollers 72 over which the ribbon or tape extends are elevated somewhat above the plane of the type face so that when the ribbon or tape is freed by the platen, the printed sheet is raised off of the type. In case of the ribbon, this saves wear of the ribbon during delivery and feeding movement, and, in case of the tapes, it prevents the printed sheet from being smudged by dragging over the inked type.

It will be seen that my invention provides in a very compact form an office printing mechanism having the maximum of automatism in its operation and having a wide range of adaptability for different uses. The machine being supplied with a removable type form and with an inking ribbon or with inking rollers and with paper it is only necessary to reciprocate the carriage either by hand power or mechanical power, as desired, and the paper is automatically fed, printed and delivered. The machine may be very quickly and easily changed from ribbon printing to direct inking, or vice versa, or the two may be used in conjunction, as desired. The type form may consist of specially formed type carried on a channeled bed, or it may be standard type or electrotypes or other members locked in a chase; several beds may be used, and one can be easily and quickly substituted for another, as desired; the parts are simple in construction and not liable to get out of order, but are easy of access for repair if necessary, or for cleaning. The machine is neat in appearance and compact, taking up little table space. The removability of the platen carriage and its handles increases this compactness in shipping.

Various modifications of the embodiment shown herein may be made without departing from my invention, and, in general, I do not wish to be understood as limiting myself to the particular construction shown further than the claims and the state of the prior art requires.

Having thus described my invention, I claim:

1. In a printing machine, the combination, with the printing couple having a stationary type bed, of a movable inking ribbon, and means for delivering the printed sheet by the movement of the ribbon.

2. The combination of a printing couple having a traveling roller impression platen and a stationary type carrying member which print by rolling contact, an inking ribbon extending between the two, and means for moving the ribbon after the impression to deliver the printed sheet.

3. The combination of a printing couple having a roller impression platen and a type carrying member which print by rolling contact, an inking ribbon extending between the two, and means for moving the ribbon after a printing impression a distance substantially as great as the length of the printed sheet to deliver such sheet.

4. The combination of a flat type bed and a roller impression platen adapted to travel back and forth over the same, an inking ribbon lying between them, and means for moving the ribbon to deliver the printed sheet.

5. The combination of a printing couple, a spring barrel, a combined inking and delivery fabric controlled by the spring barrel, and means for controlling the spring barrel to effect the delivery of the printed sheet.

6. The combination of a printing couple, a flexible inking member, a spring barrel, and means for releasing the spring barrel to wind up the flexible member to deliver the printed sheet.

7. The combination with a printing couple, of an inking ribbon, a spool on which the same is wound, and a spring barrel adapted to rotate said spool to move the ribbon with reference to the type form a sufficient distance substantially to discharge the printed sheet.

8. The combination of a type bed, a roller platen adapted to travel back and forth across the bed, a spring barrel, a delivery member controlled thereby for delivering the printed sheet, and means for winding up and releasing the spring barrel whereby the delivery member is operated substantially at each end of the stroke.

9. The combination of a stationary type bed, a roller platen adapted to travel back and forth across the bed, a spring barrel, a flexible member adapted to extend between the bed and platen and support the printed sheet, means for automatically moving said flexible member after the impression to deliver the printed sheet, and means for effectively coupling the flexible member with the spring barrel.

10. The combination of a flat type bed, a roller impression platen adapted to travel over the same back and forth, a pair of spring barrels controlled by the travel of the platen, and flexible supporting delivery mechanism extending between the bed and platen and controlled by the spring barrels.

11. The combination of a flat type bed, a roller impression platen adapted to travel over the same back and forth, a pair of spring barrels controlled by the travel of the platen, an inking ribbon serving the double purpose of inking the type and delivering the printed sheet, the ribbon being connected with the spring barrels to effect such delivery.

12. The combination with the type bed and platen, of a pair of ribbon spools, an inking ribbon, a pair of spring barrels adapted to rotate the spools respectively, and means operated by the platen for controlling the application of the springs to the barrels.

13. The combination with a flat type bed, an impression platen adapted to travel back and forth over the same, a pair of ribbon spools, an inking ribbon carried thereby and passing across the type bed, a spring barrel for each ribbon spool, means for winding the spring barrels during the stroke of the platen, and means for releasing them at the end of the stroke.

14. The combination of a type bed, a traveling impression platen, a flexible delivery member, a spool with which it is connected, a spring barrel for rotating the spool to deliver the printed product, means for winding the spring barrel during the stroke of the platen and means for releasing it and the spool at the end of such stroke, whereby the spool rotates to cause the flexible member to deliver the sheet.

15. The combination with a printing couple, of a flexible delivery member, a spring barrel for operating it, means for winding the spring barrel during the impression, and means for allowing the spring barrel to unwind and pull the delivery member following the impression.

16. The combination of a flat type bed, a roller impression member adapted to travel back and forth over the bed, an inking ribbon adapted to extend over such bed, spools for holding the ends of the ribbon, spring barrels for controlling such spools, means for winding such spring barrels during the impression stroke, and means for discharging the spring barrels at the end of the stroke.

17. The combination with a printing couple, of an inking ribbon, means for moving said ribbon with reference to the type form to deliver the printed product, and means for gradually feeding the ribbon to present a fresh face to the type.

18. The combination with a printing couple having a bed and an impression platen which travels back and forth, an inking ribbon lying between the platen and bed, means for feeding the ribbon lengthwise of the bed following the stroke of the platen a distance substantially corresponding to the length of the printed sheet to deliver such sheet, and means for gradually feeding the ribbon to present a fresh face to the type.

19. The combination with a printing couple having a bed and an impression platen which travels back and forth, an inking ribbon lying between the platen and bed, means for feeding the ribbon lengthwise of the bed following the stroke of the platen a distance substantially corresponding to the length of the printed sheet to deliver such sheet, such delivery movement of the ribbon being in opposite directions with opposite movements of the platen, and means for gradually feeding the ribbon in the same direction, irrespective of the direction of platen movement.

20. The combination of a flat bed, a traveling impression platen, an inking ribbon lying between the two, said parts being adapted to print a sheet on each stroke of the platen, irrespective of the direction of that stroke, means for moving the ribbon at the completion of a stroke in a direction opposite to that which the stroke has just taken to deliver the printed sheet, and means for giving the ribbon a feed in the same direction for successive strokes.

21. The combination with a printing couple, of an inking ribbon moved successively in opposite directions to deliver the product, and moved successively in the same direction to present a fresh face to the type.

22. The combination of a printing couple, an inking ribbon, means for moving the ribbon to deliver the printed sheet, means for gradually feeding the ribbon, and means for reversing the direction of such feed.

23. The combination of a type bed, a traveling impression platen, a ribbon adapted to lie between the two, means for moving such ribbon a distance substantially corresponding to the length of the sheet to deliver it, means for giving the ribbon another movement to present a fresh face to the type, and means for automatically reversing the direction of ribbon feed.

24. The combination of a printing couple, an inking ribbon lying between the members of the couple, means for moving the ribbon to deliver the printed product, means for giving the ribbon another movement to present a fresh face to the printing form, and means for automatically reversing the direction of ribbon feed.

25. The combination of a type bed, a pair of ribbon spools, a ribbon connected with said spools and passing across the bed, means for rotating such spools to feed the ribbon back and forth a distance corresponding to the length of the printed sheet, means for giving one of said spools a continuously increased rotation to feed the ribbon and for giving the other of such spools a continuously diminished rotation, and means for automatically reversing the direction of such feed.

26. The combination of a type bed, a pair of ribbon spools, a ribbon connected with said spools and passing across the bed, means for rotating such spools to feed the ribbon back and forth a distance corresponding to the length of the printed sheet, means for giving one of such spools a continuously increased rotation to feed the ribbon, and for giving the other spool a continuously diminished rotation and automatic means controlled by the amount of ribbon on the spools for changing the direction of the ribbon movement between the respective spools.

27. The combination of a printing couple, a ribbon, ribbon spools for carrying the same, spring barrels for driving the spools, and a flexible band connecting the spring barrels with one member of the printing couple.

28. The combination of a type bed, a pair of ribbon spools, a ribbon carried thereby, a pair of spring barrels each having a sprocket wheel, a sprocket chain thereon, a traveling platen carriage, and a connection between the same and said chain.

29. The combination of a type bed, a platen carriage, a ribbon, a ribbon spool, a spring barrel therefor, a flexible member connecting the spring barrel with the platen carriage, and means for periodically changing the connection to feed the ribbon.

30. The combination of a type bed, a pair of ribbon spools, a ribbon thereon, a pair of spring barrels having sprocket wheels, a sprocket chain on said wheels, a platen carriage, means for anchoring the chain to the carriage, and means for periodically changing such anchorage to feed the ribbon.

31. The combination of a bed, a pair of ribbon spools, a ribbon, a pair of spring barrels having sprocket wheels, a sprocket chain on said wheels, a platen carriage, a sprocket wheel carried by the carriage and engaging such chain, means for normally preventing the rotation of said last mentioned sprocket wheel to lock the carriage to the chain, and means for periodically rotating the said sprocket wheel to feed the ribbon.

32. The combination of a stationary flat bed, a traveling roller impression platen and flexible delivery mechanism extending onto both sides of the platen and serving to raise the printed sheet off the bed, combined with spools for winding in such delivery mechanism, and means for rotating such spools after the platen has completed its printing stroke.

33. The combination of a stationary flat bed, a traveling impression platen and flexible delivery mechanism extending onto both sides of the platen and serving to raise the printed sheet off the bed, combined with spools for winding in such delivery mechanism, springs for rotating said spools, and means for constraining and releasing said springs.

34. The combination, with a printing couple, of means for feeding the paper to the couple, an inking ribbon, and means for automatically moving the ribbon with reference to the type form after the completion of the printing impression to deliver the printed sheet resting on the ribbon.

35. The combination of a printing couple, a paper feed, an inking ribbon lying between the members of the couple, and serving to ink the type and act as a delivery blanket, a pair of ribbon spools for carrying the ends of the ribbon, spring barrels for controlling the spools, and means operated by the platen movement for controlling the spring barrels and the paper feed.

36. The combination of a type bed, a roller platen, a carriage for the platen, a flexible combined inking and delivery member, and an inking roller mounted on the carriage.

37. The combination of a flat bed, a traveling carriage, a roller impression platen carried thereby, an inking roller carried by the impression platen, an inking ribbon which acts also as a delivery member.

38. The combination of a bed, a traveling roller platen, a pair of inking rollers located on opposite sides of the platen, means for automatically throwing one or the other of the rollers out of action, an inking ribbon which acts also as a delivery member.

39. The combination of a flat bed, a traveling carriage, a roller impression platen carried thereby, inking rollers on opposite sides of the platen, means operated near the end of each stroke for moving one or the other of said inking rollers into idle position, the other roller coming into active position, an inking ribbon which acts also as a delivery member.

40. The combination of a type bed, a platen, a carriage therefor, means for carrying a block of paper on the platen carriage and automatically feeding sheets therefrom, a flexible delivery mechanism, and an inking roller on the platen carriage.

41. The combination of a type bed, a reciprocating carriage, a platen roller carried thereby, means for carrying paper in two blocks on opposite sides of the roller, a flexible delivery device acting in either direction, and a pair of inking rollers carried by the carriage on opposite sides of the platen roller.

42. The combination with a type bed, of a traveling rotary impression platen, inking rollers on opposite sides thereof, an inking ribbon which acts also as a delivery blanket and means for automatically rendering the rollers idle or active.

43. The combination with a type bed, of a traveling rotary impression platen, inking rollers on opposite sides thereof, an inking ribbon which acts also as a delivery blanket, means for automatically rendering the rollers idle or active at the end of each stroke, and means for holding the rollers idle, irrespective of the stroke.

44. The combination, with a printing couple, of a flexible member, a spool for the same, a spring barrel at the end of the spool consisting of an inner sleeve connected with the spool and an outer sleeve and an interposed spiral spring, means for locking and releasing the inner sleeve, and means for rotating the outer sleeve to wind the spring.

45. The combination of a printing couple, an inking ribbon adapted to extend between the members of the couple, a spool for said ribbon, a spring barrel mounted at the end of the spool for rotating it, said barrel having one member adapted to be connected with the spool, another member adapted to be driven, an interposed spring connected to the two members, mechanism for driving such driven member, and mechanism for locking and releasing the member connected with the spool.

46. The combination of a printing couple, a pair of spools, a pair of spring barrels, a sprocket chain, a carriage for reciprocating the platen of the couple, a shaft mounted on said carriage, a sprocket wheel on said shaft engaging said chain, means for controlling the rotation of said shaft, and a flexible member connected with the spools.

47. The combination, with a type bed and a traveling roller platen, of a carriage for reciprocating the platen, an inking ribbon, mechanism for operating it including a pair of sprocket wheels and a sprocket chain connected to the carriage, a connection to the carriage comprising a sprocket wheel mounted on the carriage and engaging the chain, and means for controlling the rotation of the last mentioned sprocket wheel.

48. The combination of a flat type bed, a traveling roller platen and carriage therefor, an interposed inking ribbon, a pair of ribbon spools for carrying the ends of the ribbon, means for rotating said spools to feed the ribbon, means for automatically changing the direction of feed, said last mentioned means including a sprocket wheel carried by the carriage reciprocating with the platen, a sprocket chain communicating movement to the spools, and actuating mechanism for the sprocket wheel controlled by the condition of the ribbon on the spools.

49. The combination of a hollow box-like base frame, a type bed supported at the upper face of said frame, ribbon spools located within the frame near the opposite ends, a carriage traveling in the frame beneath the type bed, means located within the frame and coöperating with said carriage for automatically reversing the direction of ribbon feed, and an inking ribbon connected with said spools and extending across the bed.

50. The combination of a type bed, a reciprocating platen, a traveling carriage connected therewith, a star wheel mounted on said carriage, abutments for said wheel, ribbon spools, and ribbon carried thereby and means for changing the presentation of said abutments according to the condition of the ribbon on the spools.

51. The combination with a type bed, of a pair of ribbon spools, an inking ribbon carried thereby and adapted to extend across the bed, spring barrels for controlling the spools, a reciprocating carriage, a sprocket chain connecting the same with the spring barrels, a star wheel on the carriage for giving an additional movement to the sprocket chain, and abutments adapted to be engaged by the star wheel at the end of its stroke to cause such feed.

52. The combination of a reciprocating carriage having a star wheel carried thereby, four abutments, two in idle position and two in active position, the active two being adapted to engage opposite points on the star wheel at the opposite ends of its stroke, links connecting the four abutments at the two ends, ribbon spools, and means for shifting the four abutments to change their presentation to the star wheel.

53. The combination of a printing couple, a traveling carriage for the platen of the couple, an inking roller carried thereby, a bell crank acting to move the roller to idle or active position, an inking ribbon which acts also as a delivery member.

54. The combination of a type bed, a traveling carriage, a roller platen carried thereby, a pair of inking rollers mounted on opposite sides of the roller platen, a pair of bell cranks for alternately raising and lowering the rollers, a pivoted member for operating the bell cranks, stops near the ends of the bed with which said pivoted member engages at opposite ends of the stroke, an inking ribbon which acts also as a delivery member.

55. The combination of a ribbon spool, a ribbon carried thereby, a spring barrel for rotating the ribbon spool to cause the ribbon to deliver a printed sheet, a lock for the spring barrel comprising a notched wheel, a dog adapted to enter such notches, a type bed, a platen coöperating therewith, means for reciprocating the same, and mechanism operated thereby for withdrawing such dog from engagement with the notched wheel.

56. The combination of a ribbon spool, a spring barrel for rotating it, a lock for the spring barrel comprising a notched wheel, a dog adapted to enter such notches, a type bed, a platen coöperating therewith, means for reciprocating the same, mechanism operated by the reciprocation of the platen for winding the spring of such spring barrel, and mechanism operated at the end of the stroke for withdrawing the dog from the notch to release the spring barrel.

57. The combination of a type bed, a pair of ribbon spools, an inking ribbon carried thereby and extending across the bed, a spring barrel for each spool, a lock for each spring barrel including a dog, a shiftable bar adapted to release both dogs, a platen, a carriage movable therewith, mechanism connected with the carriage for winding the springs during the stroke of the carriage, and mechanism connected with the carriage for shifting said bar adjacent to the ends of the stroke.

58. The combination of a symmetrically formed frame having an intermediate opening in its upper surface, a type bed adapted to rest in said opening, ribbon spools carried within the frame near the opposite ends, a platen adapted to reciprocate over the type bed, and a pair of rollers carried by the frame near its opposite ends and adapted to support the ribbon at an elevation above the top plane of the type bed.

59. The combination of a base frame having side plates and carrying a type form on its upper face, a traveling carriage extending transversely of the frame from side to side beneath the type form and having rollers in ways in the side plates, ribbon spools carried by the base frame ribbon feeding mechanism therefor controlled by said carriage, a roller platen above the type form, and a carriage in which it is mounted removably connected with the carriage first mentioned.

60. The combination, with a type bed, a hand reciprocated roller platen, an inking ribbon between the two, and an inking roller adapted to act on the type bed lengthwise of the ribbon and beyond the edge of the ribbon.

61. The combination of a printing couple, a spring, a flexible delivery member controlled by said spring, means for releasing the spring to effect the delivery of the printed sheet, and means for providing the ink for the printing impression by means of said flexible member.

62. The combination of a printing couple, a flexible inking and delivery member, a spool on which the flexible member is wound, a spring for rotating the spool to wind the flexible member, and means for locking and releasing the spool.

63. The combination of a printing couple, an inking ribbon adapted to extend between the members of the couple, and a spring adapted to move the ribbon only after the completion of the printing impression to deliver the printed sheet.

64. The combination of a printing couple having a stationary bed and a traveling platen, an inking ribbon adapted to pass between the members of the couple, a spool on which the same is wound, and a spring adapted to rotate the spool to move the ribbon a distance corresponding to the sheet printed.

65. The combination, with a printing couple, one of the members thereof having a reciprocating stroke, a ribbon, and means for automatically moving the same in the opposite direction to the stroke at the completion of the stroke a distance sufficient to feed off the printed sheet.

66. The combination of a printing couple, a flexible combined inking and delivery mechanism, a spring for operating it, and means controlled by the movement of one member of the printing couple for controlling the operation of the spring.

67. The combination of a printing couple having a type bed and a traveling roller platen, a flexible delivery mechanism, a spring for operating it, means for constraining the spring during movement of the platen, and means for releasing the spring substantially at the end of the platen movement.

68. The combination of a printing couple, one of the members thereof having a reciprocating printing stroke, an inking ribbon, a spool therefor normally locked, a spring, means for constraining the same during the stroke, and means for releasing the spool to the action of the constrained spring at or near the completion of the stroke.

69. In a printing machine, the combination, with a typeholder and a platen, one movable with reference to the other, of an inking ribbon and drums on which it is wound, and means for rotating one of the drums at the finishing portion of each stroke of the machine to move said ribbon an amount sufficient to deliver the printed page.

70. In a printing machine, the combination, with a form holder and a platen, one movable with reference to the other, of an inking ribbon, and a pair of rotatable drums on which the ribbon is wound, means for actuating the drums respectively at the finishing portion of the respective strokes of the machine to feed an amount of ribbon corresponding in length to the printing form, said strokes consisting of relative travel between the platen on the one hand and the chase and spools on the other.

71. In a printing machine, the combination, with a form holder, of a traveling platen, an inking ribbon, and two drums on which it is wound at its opposite ends, means connecting the two drums, and means for actuating the drums alternately at the finishing portion of the respective opposite strokes of the platen by an amount materially greater than the travel of the platen during the actuation.

72. In a printing machine, the combination, with a platen roll, of a form holder, means for reciprocating one with reference to the other, an inking ribbon, drums on which the ribbon is wound, marginal portions for frictional engagement of the platen roll, and means for rotating the drums independently of the platen roll at the finishing operation of each stroke to propel the ribbon for a distance sufficient to deliver the printed sheet.

73. The combination of a form holder and a platen, one of which is reciprocable, an inking ribbon, a pair of ribbon drums, and means to actuate the ribbon between the successive printing impressions by an amount sufficient to deliver the printed sheet, alternate actuations being in opposite directions.

74. The combination of a bed and cylinder, one having strokes back and forth and with the other constituting a printing machine adapted to receive a folio at each stroke end, of an inking ribbon, ribbon drums, and means to actuate the drums alternately to cause the ribbon to move an amount approximately equal to the length of a sheet to feed off the printed sheet.

75. In a printing machine, the combination, with a form holder and platen, one of which reciprocates with reference to the other, of an inking ribbon, rotatably mounted drums on which it is wound, means for rotating the drums at the finishing portion of each stroke of the machine by an amount sufficient to deliver the printed sheet, wheels on the drum shafts, and an endless band encompassing them.

76. In a printing machine, the combination, with a form holder and a platen, one of which reciprocates with reference to the other, of an inking ribbon extending over the form holder for supporting the sheet to be printed, two drums on which the opposite ends of the ribbon are wound, both mounted with their axes transverse to the path of reciprocation, and means for rotating the drums at the finishing portion of each stroke to cause the ribbon to discharge the printed sheet.

77. In a printing machine, the combination of a form holder and a platen, one traveling across the other in alternately opposite strokes, an inking ribbon, two rotatably mounted drums on which the ribbon is wound at its opposite ends, drivers for the drums, and means for actuating the drums alternately at the finishing portion of the respective opposite strokes of the machine to move said ribbon by an amount sufficient to deliver the printed sheet.

78. In a printing machine, the combination of a typeholder, a ribbon extending over a portion of the same, an inking roller adapted to act on a portion of the form not covered by the ribbon, and a reciprocable platen coacting with both portions of the form, said platen and inking roller being reciprocable together.

79. The combination of a stationary type form, a pair of ribbon spools at the opposite ends of the form, a ribbon extending from one spool to the other across a portion of the form, a traveling inking roller adapted to engage a portion of the form alongside of the ribbon, and a traveling platen roller adapted to engage both the ribbon-inked and direct-inked portions of the form.

In testimony whereof, I hereunto affix my signature in the presence of two witnesses.

BRENNAN B. WEST.

Witnesses:
ALBERT H. BATES,
H. MILLER.